Sept. 18, 1956     D. C. HERSTEDT     2,763,222
WEED EXTERMINATOR
Filed June 27, 1955                            2 Sheets—Sheet 1
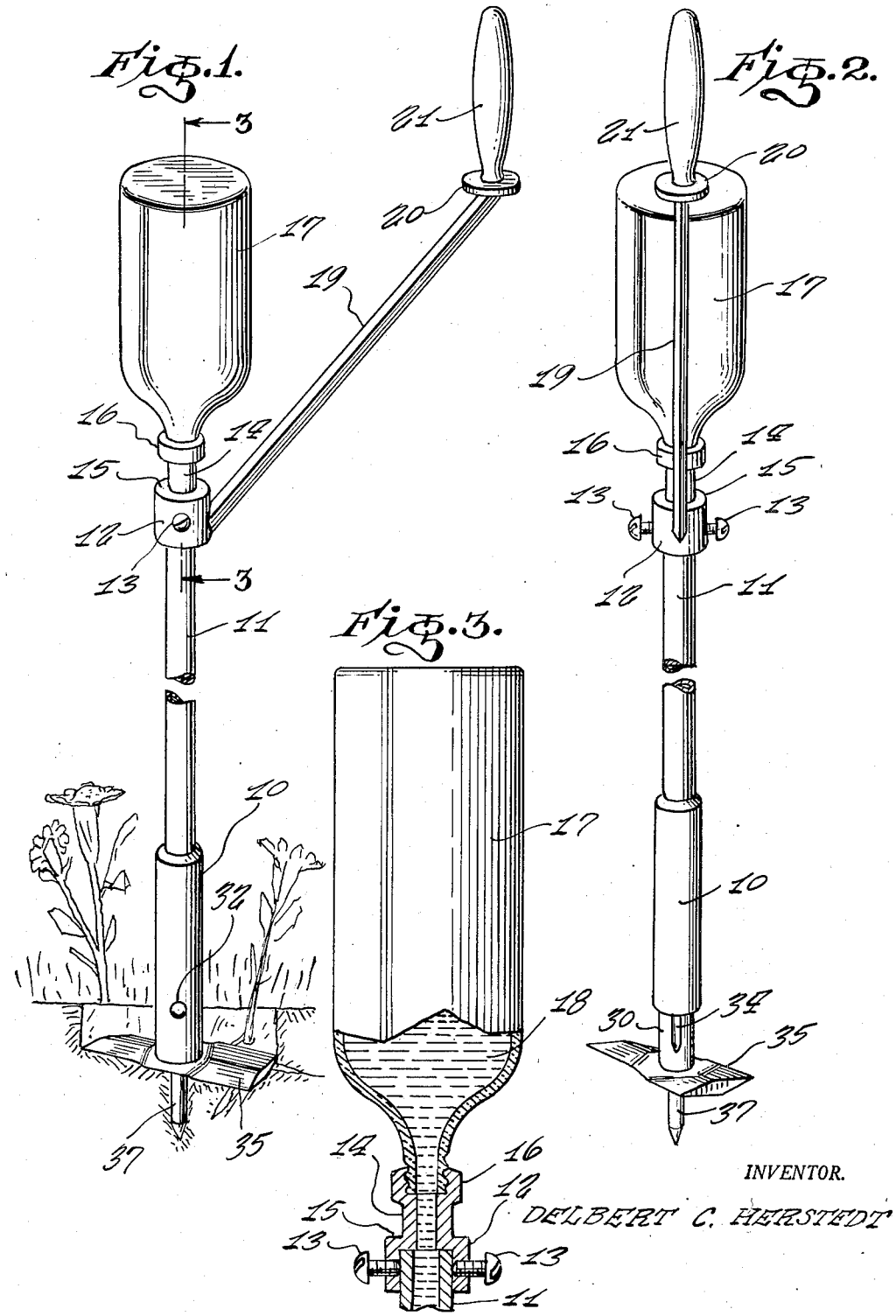
INVENTOR.
DELBERT C. HERSTEDT

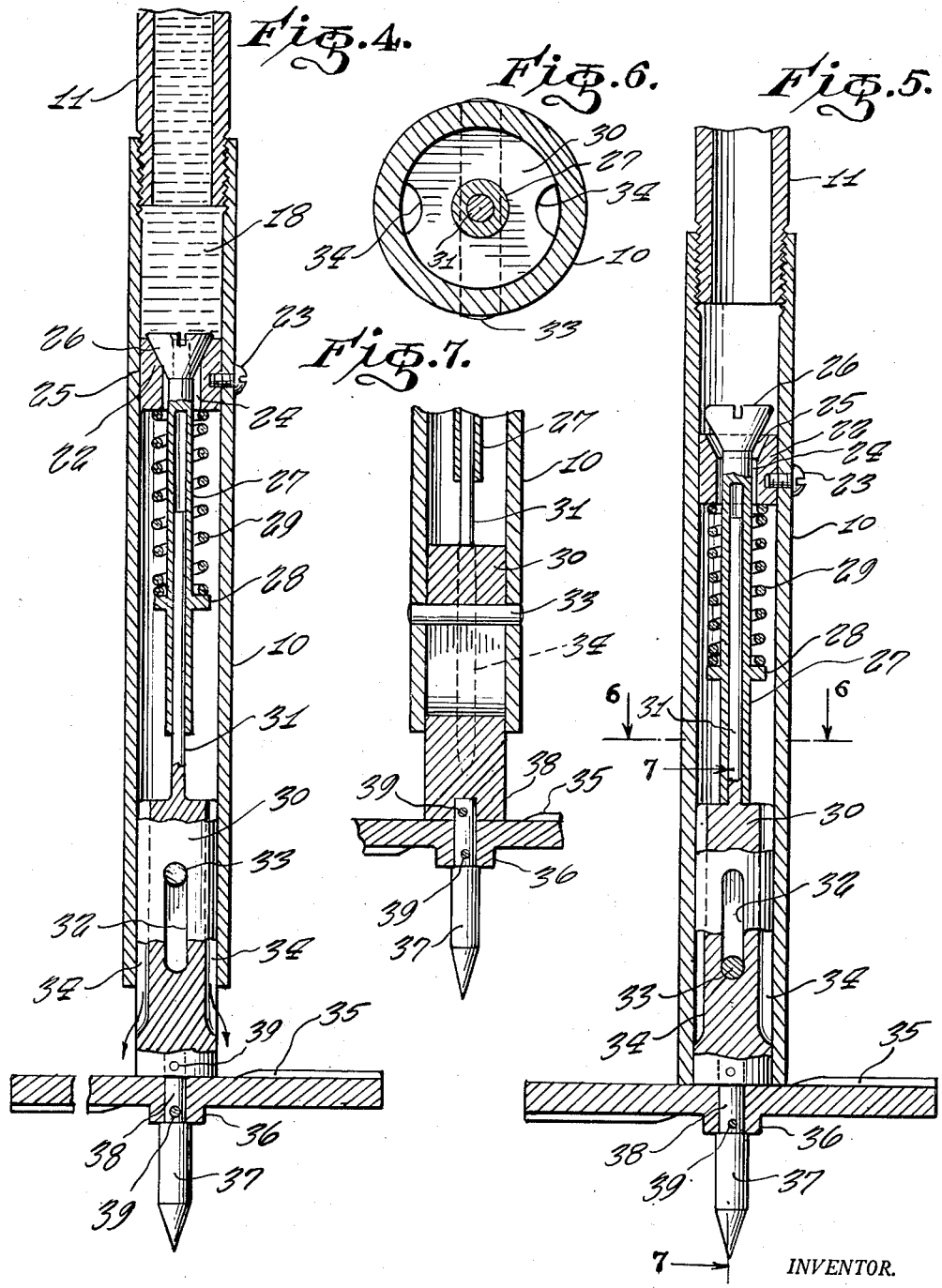

United States Patent Office 2,763,222
Patented Sept. 18, 1956

2,763,222

WEED EXTERMINATOR

Delbert C. Herstedt, Moline, Ill.

Application June 27, 1955, Serial No. 518,183

3 Claims. (Cl. 111—7.3)

This invention relates to weed exterminators.

It is an object of the present invention to provide a weed exterminator which will eliminate stooping and bending on the part of the operator.

It is another object of the present invention to provide a weed exterminator of the above type wherein, as the weed is cut and the device is removed from the ground, the exterminating fluid will be released, also thereby destroying the weeds and roots.

It is another object of the present invention to provide a weed exterminator of the above type which requires only a few seconds to operate.

Other objects of the present invention are to provide a weed exterminator of the above type having the above objects in mind which is of simple construction, has a minimum number of parts, is easy to use, inexpensive to manufacture and efficient in operation.

For other objects and a better understanding of the invention, reference may be had to the following detailed description taken in connection with the accompanying drawing, in which:

Figure 1 is a perspective view of a preferred embodiment of the present invention showing the same in operative use and cutting the weeds;

Fig. 2 is a side elevational view thereof shown alone;

Fig. 3 is a sectional view taken along the line 3—3 of Fig. 1;

Fig. 4 is a vertical sectional view thereof showing the valve in the closed, liquid releasing position, as the device is rotated out of the ground;

Fig. 5 is a view similar to Fig. 4 but showing the valve in the open position, after the device has been pressed downwardly into the ground and before the removal thereof;

Fig. 6 is a transverse sectional view taken along the line 6—6 of Fig. 5; and

Fig. 7 is a vertical sectional view taken along the line 7—7 of Fig. 5.

Referring now more in detail to the drawing, 10 represents a valve casing of hollow cylindrical stock open at both ends, the upper end thereof being internally threaded and having screwed downwardly therewithin the externally threaded lower end of the hollow cylindrical member 11, substantially as illustrated.

A collar 12 is secured to the upper end of the tubular member 11 by means of the oppositely disposed set screws 13, the collar 12 at the upper end thereof being integrally formed with the reduced extension 14 providing thereby a shoulder 15 which abuts the upper end of the tubular member 11 whereby to limit the downward displacement thereon. The upper end of the extension 14 is integrally formed with the enlarged internally threaded collar 16 into which is screwed the externally threaded neck of the bottle 17 containing the liquid exterminator fluid 18.

An upwardly and outwardly extending lever 19 is secured to the collar 12 and is provided at its upper end with the circular plate 20 on which is mounted a handle 21 whereby to rotate the device about the longitudinal axis of the valve housing 10 in a manner which will hereinafter become clear. It will be apparent that the exterminator liquid 18 will be fed by gravity downwardly through the tubular member 11 and into the valve housing 10.

As shown in Fig. 4, a cylindrical insert 22 is secured within the valve housing 10 near the upper end thereof by means of the set screw 23, the insert 22 being provided with a cylindrical bore 24 which communicates at its upper end with the frusto-conical enlarged valve seat 25. A frusto-conical valve 26 is adapted to fit downwardly within the valve seat 25 and is integrally formed at its lower end with the elongated hollow tubing 27, the latter being integrally formed with a shoulder 28 near its lower end for a purpose which will hereinafter become clear. A coil spring 29 sleeves the tubing 27 intermediate the shoulder 28 and the insert 22 and serves to normally retain the valve 27 in the closed position and to prevent the downward flow of the liquid 18 through bore 24, as will be obvious.

A shaft 30 is slidably mounted within the lower end of the housing 10 and is integrally formed at its upper end with the upwardly extending valve stem guide 31 which is slidably received within the tubing 27, the shaft 30 being provided with the vertically elongated slot 32 therethrough and within which is positioned a transverse pin 33 the ends of which are secured to the housing 10. Thus, the pin 33 will serve to limit the sliding movement of the shaft 30 in opposite directions. The shaft 30 is provided on the outside thereof with the longitudinally extending grooves 34 which are adapted to permit the passage downwardly therethrough of the exterminator liquid when the valve 26 is opened.

A rotary cutting blade 35 having a hub 36 is secured to the lower end of the shaft 30 by means of a point 37 integrally formed at its upper end with the reduced shank 38 which is received upwardly within an opening provided in the lower end of the shaft, the extension being secured therein by the pins 39.

In operation, the pointer 37 and blade 35 are pressed downwardly into the ground (Fig. 1), which action causes the shaft 30 to slide upwardly within the valve housing 10 until the lower end of the housing abuts the blade 35 (Fig. 5). As the shaft 30 moves upwardly, the upper end thereof contacts the lower end of the tubing 27, forcing the latter upwardly and moving the valve 26 upwardly from the seat 25 and permitting the liquid 18 to feed by gravity downwardly through the bore 24 into the lower housing 10 and downwardly into the grooves 34. The tool is then rotated by means of the handle 21 to cut the weeds and as the tool is rotated upwardly out of the ground, the shaft 30 moves back to its original position under the action of spring 29, which feeds the liquid downwardly onto the roots of the weed through the grooves 34 in the direction of the arrows of Fig. 4. This latter movement again closes the valve 26 until the next operation. Thus, the crown of the dandelion or weed is destroyed as the blade 35 is rotated into the ground, cutting the roots. As the exterminator is rotated out of the ground, a fluid is released, destroying the roots in this operation. The entire operation requires only a few seconds and eliminates the necessity of stooping and bending.

The exterminator does not have to be rotated into the ground to destroy the dandelions or weeds as it can be merely pushed down, opening the control valve and when lifted releasing the fluid. The control valve unit can easily be replaced by removal of the screw 23.

While various changes may be made in the detail construction, it shall be understood that such changes shall be within the spirit and scope of the present invention as defined by the appended claims.

What I claim as new and desire to protect by Letters Patent of the United States is:

1. A weed exterminator comprising an elongated valve housing, a liquid feed housing connected to the upper end of said valve housing, liquid exterminator supply means at the upper end of said liquid feed housing, means for rotating said liquid feed and valve housings, a rotary cutting blade at the lower end of said valve housing, and valve means within said valve housing spring loaded to a valve closed position and actuated to a valve open position upon insertion of said blade into the ground, said valve means comprising a valve seat within said valve housing, a valve within said seat having a depending tubular member, a shoulder on said tubular member below said valve seat, and a coil spring sleeving said tubular member intermediate said valve seat and shoulder whereby to maintain said valve in the normally closed position, including a shaft slidable longitudinally within the lower end of said valve housing and having a rod extending upwardly within said tubular member, said shaft having a vertically elongated slot therethrough and a transverse pin piercing said housing and positioned within said slot whereby to limit the upward and downward displacement of said shaft, said rotary cutting blade being secured to the lower end of said shaft, said shaft having longitudinally extending grooves adapted to permit the feeding of the liquid exterminator downwardly onto the roots as the device is rotated upwardly out of the ground.

2. A weed exterminator according to claim 1, said rotary cutter having a central hub saving a bore therethrough, a cylindrical member having a point at its lower end, said cylindrical member having a reduced shank at its upper end extending upwardly through said hub, said shaft having an opening at its lower end receiving said extension upwardly therewithin and pin means securing said extension to said shaft and hub.

3. A weed exterminator according to claim 1, said rotating means comprising a collar on the upper end of said liquid feed housing, set screw means securing said collar in position, an upwardly and outwardly extending lever secured to said collar and a vertical handle rotatably mounted on the upper end of said lever, and a flat disc intermediate said handle and the upper end of said lever.

References Cited in the file of this patent

UNITED STATES PATENTS

| | | |
|---|---|---|
| 1,110,182 | Blandin | Sept. 8, 1914 |

FOREIGN PATENTS

| | | |
|---|---|---|
| 8,403 | Australia | 1927 |
| 8,852 | Austria | Aug. 25, 1902 |